United States Patent
Mann et al.

(10) Patent No.: US 9,327,485 B2
(45) Date of Patent: May 3, 2016

(54) UNIT FOR LAMINATING A FIRST WEB ONTO A SECOND WEB IN A LAMINATING MACHINE AND METHOD FOR MANUFACTURING A MULTI-LAYER COMPOSITE

(71) Applicants: Alex Mann, Bibern (CH); Markus Zimmermann, Rüttenen (CH); Adrianus Jongmans, Nijverdal (NL)

(72) Inventors: Alex Mann, Bibern (CH); Markus Zimmermann, Rüttenen (CH); Adrianus Jongmans, Nijverdal (NL)

(73) Assignee: BOBST GRENCHEN AG (CH)

( * ) Notice: Subject to any disclaimer, the term of this patent is extended or adjusted under 35 U.S.C. 154(b) by 0 days.

(21) Appl. No.: 13/623,993

(22) Filed: Sep. 21, 2012

(65) Prior Publication Data
US 2013/0068369 A1 Mar. 21, 2013

(30) Foreign Application Priority Data

Sep. 21, 2011 (EP) .................................. 11007666

(51) Int. Cl.
*B32B 41/00* (2006.01)
*B32B 38/18* (2006.01)
(Continued)

(52) U.S. Cl.
CPC ........... *B32B 38/1841* (2013.01); *B31F 1/2836* (2013.01); *B31F 1/2881* (2013.01); *B32B 37/0053* (2013.01); *B32B 37/1054* (2013.01);
(Continued)

(58) Field of Classification Search
CPC .. B29C 43/58; B29C 66/836; B65H 23/1886; B26D 5/20; B32B 2317/12

USPC ........... 156/64, 350, 351, 360, 362, 363, 364, 156/378, 379
See application file for complete search history.

(56) References Cited

U.S. PATENT DOCUMENTS 4,773,959 A * 9/1988 Smith et al. .................... 156/351
5,788,802 A * 8/1998 Raney ............................ 156/351
(Continued)

FOREIGN PATENT DOCUMENTS

EP 0 825 016 A1 2/1998
WO WO 96/27494 9/1996

OTHER PUBLICATIONS

European Search Report dated Feb. 9, 2012 issued in corresponding European Patent Application No. EP 11 00 7666.

*Primary Examiner* — Alison L Hindenlang
*Assistant Examiner* — Joshel Rivera
(74) *Attorney, Agent, or Firm* — Ostrolenk Faber LLP

(57) ABSTRACT

A laminating unit to manufacture a multi-layer composite (2) in a laminating machine (1), comprising a laminating rotating roll (16), laminating a first web (3) onto a second web (4), is characterized in that it further comprises:
  driving means (42), rotating (R) the roll (16);
  gripping means (39, 41), maintaining the first web (3) in contact with the roll (16);
  first detection means (43, 46) emitting first detection signals (44, 47) in accordance with detected longitudinal positions of the first web (3);
  second detection means (48, 51) emitting second detection signals (49, 52) in accordance with detected longitudinal positions of the second web (4); and
  control means (53), regulating a rotation speed of the driving means (42) and of the roll (16) as a function of the first and second signals (44, 47, 49, 52), to convey, correct longitudinally positions of the first web (3), and laminate the first web (3) in register onto the second web (4).

15 Claims, 1 Drawing Sheet

(51) Int. Cl.
*B31F 1/28* (2006.01)
*B32B 37/00* (2006.01)
*B32B 37/10* (2006.01)
*B32B 38/00* (2006.01)

(52) U.S. Cl.
CPC ........... *B32B 38/145* (2013.01); *B32B 38/1858* (2013.01); *B32B 2309/72* (2013.01); *B32B 2317/127* (2013.01); *B32B 2553/00* (2013.01)

(56) References Cited

U.S. PATENT DOCUMENTS

| | | | |
|---|---|---|---|
| 5,930,139 A * | 7/1999 | Chapdelaine et al. | 700/118 |
| 6,276,421 B1 | 8/2001 | Valenti et al. | 156/521 |
| 2011/0079340 A1* | 4/2011 | Mayer et al. | 156/64 |

* cited by examiner

UNIT FOR LAMINATING A FIRST WEB ONTO A SECOND WEB IN A LAMINATING MACHINE AND METHOD FOR MANUFACTURING A MULTI-LAYER COMPOSITE

TECHNICAL FIELD OF THE INVENTION

The present invention relates to a laminating unit for laminating a first web onto a second web in a laminating machine. The invention concerns to a laminating machine comprising a unit for laminating a first web onto a second web. The invention relates also to a method for manufacturing a multi-layer composite by laminating a first web onto a second web.

BACKGROUND OF THE INVENTION

Multi-layer composite materials are used in the field of packaging, after they have been cut, folded and glued. One of these composites commonly used is corrugated board. It is used mainly as a protective packaging that is particularly strong while being readily recyclable.

Corrugated board is for example made up of an inner board provided with flutes, bonded onto a first flat coverboard on one side of the flutes. This inner board with first flat coverboard constitutes a single-face corrugated board. The single-face corrugated board obtained is also bonded, i.e. laminated, with a second flat board on the other side of the flutes.

To make the packaging more attractive, the corrugated board is often modified, for example printed matter is printed on it. This operation is performed by flexography in order to obtain quality prints in multiple colours. However, printed corrugated board may exhibit defects, for example in the case of relatively thin corrugated board. The defects are not acceptable for packaging for expensive products.

Some printing defects among others are lines corresponding to each tip of the flutes because, during printing, the corrugated board will be crushed slightly. The difference in strength between the tips of the flutes and the regions separating two consecutive flute tips is the main reason why these lines appear during the printing operation.

For avoiding these defects, one technique then is to use laminating to assemble a sheet-like element in the form of a pre-modified for example preprinted sheet of board, onto a backing in the form of a single-face corrugated board or single-face corrugated web. Another technique is to use laminating to assemble a first web in the form of a first preprinted solid board web, onto a second web in the form of a second single-face corrugated board web.

The manufacture of a corrugated cardboard according to the second technique is carried out by means of a laminating machine which includes, upstream to downstream:
  a first feeding unit for the first web, the first web coming from a first reel,
  a second feeding unit for the second web, the second web coming from a second reel,
  a gluing unit for the glue coating, in which a device deposits a layer of glue for example on the tip of the flutes of the second web,
  a laminating unit for the junction and for the gluing of the first web on the second web, i.e. on the tips of the single-face corrugated web,
  devices for longitudinal and transverse cutting of the composite obtained, for example of the corrugated web obtained, and
  a delivery unit for cardboard sheets cut at the requested format.

If the second web is a single-face corrugated board, it could also be produced in line with a corrugator, which is placed upstream of the laminating machine.

In usual production of corrugated board, the glue is starch-based glue. This glue requires a heating device inserted in the laminating unit into the production line. The glue is inexpensive and widely used for obtaining a strong fastening of the upper, intermediate fluted and lower layers together. However this glue is not adapted for the production of quality packaging sheets, as it penetrates the paper layers. The high content of glue leads to printings that include defects, such as spots or lines.

For obtaining a better quality, the producers use cold glue, for example a vinylic glue. Less penetration of this cold glue into the layer of the paper substrate on which it is coated occurs because it is not necessary to introduce additional heat. This avoids defects at the printed surface or surfaces of the end product. In the laminating unit, the gluing of cover sheets on the tip of the flutes requires also a significant supply of glue. Vinylic glue is, however, a costly glue.

In the known laminating unit, the lamination is performed at a convergence line situated between a top laminating roll and a bottom maintaining roll or a bottom vacuum table. A second, driven top roll is intended to pull the first web by squeezing it against the laminating roll. The first web and the laminating roll are driven by the second web which is itself longitudinally driven by a transport device such as a vacuum belt.

Slipping of the first web negatively affects the register of the printed first web to the printed second web. For instance, the printing on the surface of the first web does not correspond to the printing on the opposite surface of the second web. A production batch may be wasted by defects and be rejected.

Moreover for obtaining driving movement without sliding, delamination or pulling out of the first web with respect to the second web, the operator may increase the quantity of glue. The price of the packaging increases with a higher quantity of glue. On the other hand, if the quantity of glue is not sufficient, small sliding may occur, with the result that the strength of the composite obtained by the lamination decreases.

SUMMARY OF THE INVENTION

It is a main objective of the present invention to produce a unit for manufacturing a multi-layer composite by the lamination of a first web onto a second web in a laminating machine having a high productivity. A second objective is to enhance the register of one web with respect to the other web, the webs being laminated together. A third objective is to develop a method for manufacturing a multi-layer composite by laminating together two webs with a high accuracy. A fourth objective is to provide a laminating method in which positions of the first web are adjusted precisely and rapidly. A fifth objective is to obtain a laminating unit allowing the glue consumption to be reduced. Yet another objective is to create a laminating machine that includes a laminating unit that operates at high speed and yields a low level of rejected boards.

In the present invention a laminating unit laminates a first web onto a second web to manufacture a multi-layer composite in a laminating machine. The laminating unit comprises a laminating rotating roll, laminating the first web onto the second web to manufacture the laminated multi-layer composite.

According to one aspect of the invention, the unit is characterized in that it further comprises:

driving means, rotating the laminating rotating roll;
gripping means, maintaining the first web in contact with the laminating rotating roll;
first detection means emitting first detection signals in accordance with detected longitudinal positions of the first web;
second detection means emitting second detection signals in accordance with detected longitudinal positions of the second web; and
control means, regulating a rotation speed of the driving means and of the laminating rotating roll as a function of the first detection signals and second detection signals, to convey longitudinally the first web, to correct longitudinally the position of the first web, and to laminate the first web in register onto the second web.

In other words, the laminating rotating roll can be accelerated or decelerated in its forward motion according to the respective positions of the first and second webs. If the first web is late with respect to the second web, the driving means increases the speed of the roll to cause a faster advance of same first web. If the first web is ahead of the second web, the driving means decreases the speed of the roll to obtain a delayed advance of same first web.

The accurate register is obtained by the regulated synchronisation of the first and second webs. The control means of the driving means are in electrical connection with the first and second detection means. A desynchronizing between the two webs is detected and immediately corrected directly thanks to the laminating roll. The composite emerging from the laminating roll corresponds exactly to the requested correction.

The gripping means avoids a slippage of the first web on the laminating roll. The first web is maintained by the roll during the lamination and positioned onto the second web without any loosening. The first web modified surface will not be damaged by slippage.

The positioning of one web onto the other is performed with a higher accuracy thanks to the driving means. This avoids the formation of a longitudinal shifting between the two webs. Without any significant displacement of one web on the other, the laminating process requires less glue. With the driving means, the movement speed of the first web is continuously and accurately adapted to the movement speed of the second web.

The first and second web are for example paper board, cardboard, single-face corrugated cardboard, double-face corrugated board, flexible plastic or foam, which are modified. The first and second webs comprise modifications or are already modified, for example, have printed matter thereon which is printed using flexography, photogravure or offset printing machines, creased, embossed, calendered, metalized, hot or cold foil stamped, or stuck with holograms, labels, etc.

In another aspect of the invention, a laminating machine comprising a first feeding unit for feeding the first web and a second feeding unit for feeding the second web is characterized in that it comprises the laminating unit, that has one or more of the technical features described and claimed hereinbelow, and positioned downstream from the first and second feeding units.

According to yet another aspect of the invention, a laminating method for manufacturing a multi-layer composite by laminating a first web onto a second web in a laminating machine, comprises, in this order, the steps consisting of:
conveying the first web in a longitudinal direction;
conveying the second web in the longitudinal direction;
bonding the first web onto the second web; and is characterized in that it further comprises the steps consisting of:
detecting longitudinal positions of the first web;
detecting longitudinal positions of the second web; and
correcting longitudinally the positions of the first web, in accordance with the detected positions of the first web and with the detected positions of the second web, this correction step being placed between the detecting steps and the bonding step.

In other words, a step of moving the first web with additional longitudinal small acceleration or deceleration running is added to the usual step of longitudinal transport of this first web. All ranges of distances for the incorrect positions of the first web are covered and can be corrected. This correction permits an accurate positioning of the first web to match exactly the positions of the second web. The modifications on both sides of the composite thus correspond to each other.

The longitudinal, upstream and downstream directions are defined with reference to the direction in which the first and second webs travel in the longitudinal direction through the laminating unit and through the laminating machine along their central longitudinal axis. The transverse or lateral direction is defined as being the direction perpendicular to the direction of travel of the first and second webs in the plane formed by such first and second webs respectively.

BRIEF DESCRIPTION OF THE DRAWINGS

The invention will be clearly understood and its various advantages and features will become better apparent from the following description of the non-limiting exemplary embodiment given with reference to the attached schematic drawings in which.

DETAILED DESCRIPTION OF THE PREFERRED EMBODIMENTS

Figure 1:
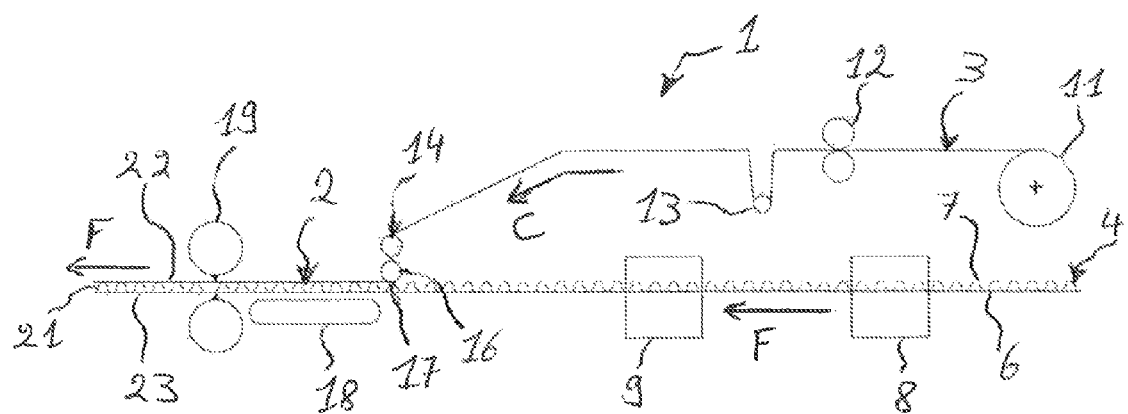
FIG. 1 depicts a simplified partial side view of a laminating machine.

As shown in FIG. 1, a laminating machine 1 produces a multi-layer composite 2. The multilayer composite 2 is formed in the machine 1 by laminating a first web 3 onto a second web 4. The first web 3 is in the form of a cardboard web. In this example, the cardboard web 3 has printed matter on it. The second web 4 is in the form of a single-face corrugated web. The single-face web 4 is composed of a bottom layer 6 on which a fluted layer 7 is bonded. In this example, the visible face of the bottom layer 6 has printed matter on it. This type of assembly for the laminating machine 1 is known as a reel-to-reel laminator.

The machine 1 can comprise a feed unit (not represented) for the single-face web 4 in its upstream part. For the described example, the machine 1 is fed by an unwinder, the single-face web 4 coming from a reel (not visible). The machine 1 can also be arranged for instance at the exit of a corrugating machine (not shown) that produces the single-face web 4.

The single-face web 4 is then driven toward the longitudinal downstream direction (Arrow F in FIG. 1) by a first main conveying section 8, such as an endless vacuum belt. At this stage, the machine 1 comprises a glue-coating unit 9, in which glue is applied to the upper face of the single-face web 4, i.e. on each tip of the flute of the fluted layer 7.

The machine 1 in its upstream part can comprise a feed unit (not represented) for the cardboard web 3. The feed unit comprises an unwinder for unwinding a reel 11. The cardboard web 3 is conveyed in the longitudinal direction (Arrow C in FIGS. 1 and 2) by means of a pull unit 12 in the form of two friction rollers, the web 3 being inserted between the two rollers. Following the pull unit 12 is a dancer 13 to ensure a continuous tensioning of the cardboard web 3.

The machine 1 next comprises a laminating unit 14 positioned, on the one hand, downstream of the glue-coating unit 9 and, on the other hand, downstream of the dancer 13. The laminating unit 14 comprises a top rotating laminating roll 16. A convergence or lamination line 17 for the lamination corresponds to the line 17 where the cardboard web 3 reaches and is bonded to the single-face web 4. This line 17 is situated between the laminating roll 16 and a bottom laminating roll (not shown).

The cardboard web 3 reaches the line 17 thanks to the pull unit 12. The single-face web 4 reaches the line 17 thanks to the main conveying section 8. At this line, the cardboard web 3 is positioned and bonded onto the adhesive-coated single-face web 4. The composite 2 is thus formed thanks to the rotation of the laminating roll 16 and the bottom laminating roll as the single-face web 4 and the cardboard web 3 simultaneously advance.

The composite 2 is pulled downstream by a transportation section 18. The composite 2 is then cut by a cutting unit 19 to produce individual plate elements or corrugated board sheets 21. The sheets 21 leave the machine 1 downstream (Arrow F in FIGS. 1 and 2). The composite 2 and each of the sheets 21 have an upper face 22 including the cardboard web 3 and an under face 23 including the bottom layer 6 of the single-face web 4. In most cases, the upper face 22 and the under face 23 have printed matter on them, depending on the cardboard web 3 and the single-face web 4.

Figure 2:
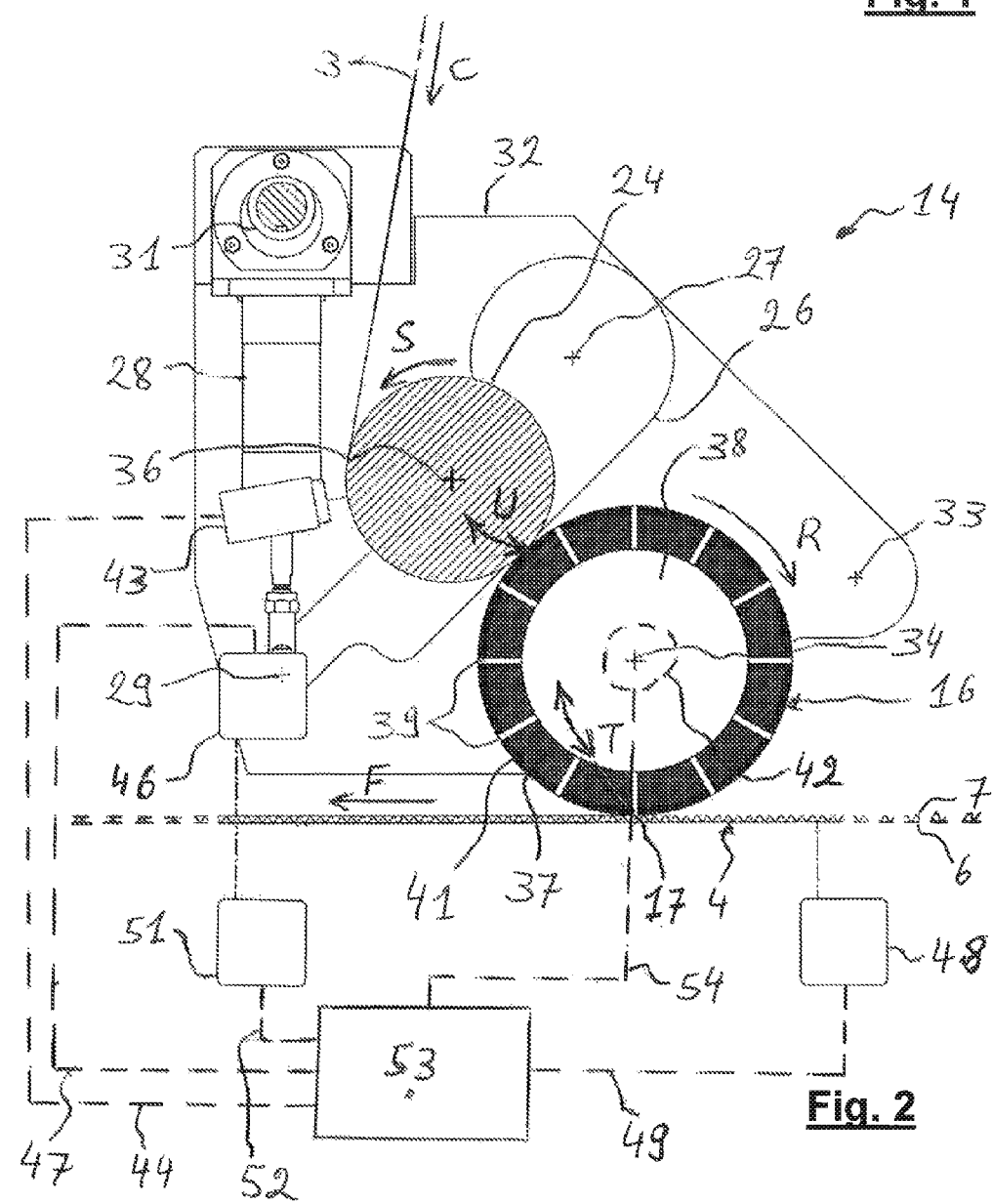
FIG. 2 depicts a partial cross-sectional view of a laminating unit according to the invention.

The laminating unit 14 is designed to position the cardboard web 3 very precisely on the single-face web 4. As shown in FIG. 2, the laminating unit 14 comprises a second roll 24 for squeezing the cardboard web 3 against the laminating roll 16. The laminating roll 16 and the second roll 24 are parallel and disposed transversely. The cardboard web 3 runs round approximately half the second roll 24 and then touches the laminating roll 16. The cardboard web 3 runs round approximately more than half the laminating roll 16 and leaves it at the convergence line 17.

A gap between the second roll 24 and the laminating roll 16 is adjusted to the thickness of the cardboard web 3. For this, the laminating unit 14 comprises advantageously means for moving the second roll 24 away from and closer to the laminating roll 16. The second roll 24 is thus mounted on a lifting arm 26 acting as a lever. The lifting arm 26 pivots on a rotation axis 27 provided at a first end thereof. A jack 28 is mounted at the opposite end of the lifting arm 26 with pivot means 29. The jack 28 is attached to an eccentric 31 to smoothly adjust the gap between the laminating roll 16 and the second roll 24.

The lifting arm 26 pivots up and down (Arrow U in FIG. 2) on the axis 27, by being raised and lowered thanks to the jack 28. This pivoting movement U is used to increase or decrease the distance between the second roll 24 and the laminating roll 16 according to the thickness of the cardboard web 3. This pivoting movement U is used to position the second roll 24 and the cardboard web 3 against the laminating roll 16. This pivoting movement U is also used to open widely the gap between the second roll 24 and the laminating roll 16 to allow the operator to insert the cardboard web 3 at the beginning of the production.

To ensure a lamination with a high quality without crushing the obtained composite 2 or without delamination of the cardboard web 3 from the composite 2, the gap between the laminating roll 16 and the bottom laminating roll is controlled. The laminating roll 16 can thus be lifted and lowered (Arrow T in FIG. 2) to allow more or less gap for the composite 2. The control is performed according to the thickness of the composite 2.

For this, the laminating unit 14 comprises means for lifting and lowering the laminating roll 16. The laminating roll 16 is mounted on a structure body 32. The structure body 32 pivots on an axle 33 by being driven via a linear motorised motion system (not shown).

The laminating roll 16 of the laminating unit 14 rotates (Arrow R in FIG. 2) on a transverse axis 34. The second roll 24 is maintained by a transverse axis 36 so as to rotate freely (Arrow S in FIG. 2). The cardboard web 3 maintained between the laminating roll 16 and the second roll 24 is pulled by both rolls 16 and 24.

The laminating roll 16 is in the form of a hollow cylinder. The cylinder has an outer wall 37 and an internal chamber 38, which is cylindrically shaped. According to the invention, the laminating roll 16 comprises first gripping means, preferably in the form of at least one suction opening 39.

The openings 39 are drilled through the outer wall 37 for a connection of the internal chamber 38 with an external surface 41 of the laminating roll 16. The external surface 41 of the laminating roll 16 is in contact with the cardboard web 3. For instance, twelve openings 39 are evenly spaced from each other and distributed around the circumference of the laminating roll 16.

The internal chamber 38 is connected to a vacuum source via a suction duct. A first end of the laminating roll 16 extends with a portion of an axial rotation shaft that includes the suction duct (not shown). The internal chamber 38 and thus the suction openings 39 are in connection with the vacuum source. The cardboard web 3 is laid and maintained by suction in contact with the surface 41 of the laminating roll 16.

The laminating roll 16 comprises second gripping means, the external surface 41 being favourably coated by a layer of a high grip material, such as rubber. With the two gripping means, suction openings 39 and high grip material, the gripping of the cardboard web 3 on the laminating roll 16 is enhanced. The cardboard web 3 is thus positioned on the single-face web 4 without any slippage. The operator can decrease the quantity of glue as the cardboard web 3 and the single-face web 4 move simultaneously at the convergence line 17.

The laminating roll 16 is driven into rotation on its axis 34 thanks to driving means, such as an electrical motor 42. A second end of the laminating roll 16 extends with a portion of an axial rotation shaft that is mechanically connected to the motor 42.

The laminating unit 14 comprises first means for detecting longitudinal positions of the cardboard web 3. The first detection means are able to detect the flow rate of modifications that have been provided previously on the surface of the cardboard web 3 and that give the modified upper face 22 of the composite 2.

The first detection means comprises advantageously a first detector 43. This first detector 43 is placed upstream from the laminating roll 16 and near the second roll 24. The first detector 43 scans the surface of the cardboard web 3 as the latter runs on the second roll 24, and before being laminated on the single face web 4. A first detection signal 44 is emitted by the first detector 43 in accordance with detected longitudinal positions of the cardboard web 3 when the detection is performed.

The first detection means comprises advantageously a second detector 46. This second detector 46 is placed downstream from the laminating roll 16. The second detector 46 scans the surface of the cardboard web 3 as the latter leaves the laminating roll 16 and after being laminated on the singled face web 4. A second detection signal 47 is emitted by the second detector 46 in accordance with detected longitudinal positions of the cardboard web 3 when the detection is performed.

The first and second detectors 43 and 46 are preferably in the form of longitudinal optical detectors that read or detect the arrival of printed matter, such as printed register marks or just images, that are printed beforehand longitudinally on the surface of the cardboard web 3. Such register marks give the accurate longitudinal positions of all the printed matter on the cardboard web 3.

The laminating unit 14 comprises further second means for detecting longitudinal positions of the single-face web 4. The second detection means are able to detect the flow rate of modifications that have been provided previously on the surface or bottom layer 6 of the single-face web 4 and that give the modified under face 23 of the composite 2.

The second detection means comprises advantageously a third detector 48. This third detector 48 is placed upstream from the laminating roll 16 and underneath the laminating unit 14 as the printed surface of the single-face web 4 is oriented downwardly. The third detector 48 scans the surface of the single-face web 4 before it is laminated with the cardboard web 3. A third detection signal 49 is emitted by the third detector 48 in accordance with detected longitudinal positions of the single-face web 4 when the detection is performed.

The second detection means comprises advantageously a fourth detector 51. This fourth detector 51 is placed downstream from the laminating roll 16. The fourth detector 51 scans the surface of the single-face web 4 as the latter leaves the laminating roll 16 and after it is laminated with the cardboard web 3. A fourth detection signal 52 is emitted by the fourth detector 51 in accordance with detected longitudinal positions of the single-face web 4 when the detection is performed.

The third and fourth detectors 48 and 51 are preferably in the form of longitudinal optical detectors that read or detect the arrival of printed matter, such as printed register marks or just images, that are printed beforehand longitudinally on the surface of the single-face web 4. Such register marks give the accurate longitudinal positions of all the printed matter on the single-face web 4.

According to the invention, the laminating unit 14 is used to correct the position of the cardboard web 3 and laminate it accurately with the laminating roll 16 on the single-face web 4. The speed of the laminating roll 16 is controlled so as to correspond to the advanced and measured position of the single-face web 4. With the invention and with the control of the laminating roll 16, the printing on the upper face 22 is exactly in register with the printing on the under face 23 for the obtained composite 2 and corrugated board sheet 21.

The laminating unit 14 comprises means 53 for controlling the motor 42 to convey and correct longitudinally the position of the cardboard web 3. The control means 53 and the motor 42 are capable of generating all the accelerations and decelerations required for regulating a rotation speed of the laminating roll 16. A regulation signal 54 is emitted to the motor 42 for regulating the rotation speed of the laminating roll 16.

This regulation is a function of the signals 44, 47, 52 and/or 49 from the first and second detection means to convey and correct longitudinally positions of the cardboard web 3, and laminate the cardboard web 3 in register with the single-face web 4. Thus, the registering is made on the basis of the detected longitudinal positions of the printed cardboard web 3 and on the basis of the detected longitudinal positions of the printed single-face web 4 before and after laminating.

A first and coarse regulation is made by using the first signal 44 of the first detector 43 that corresponds to the longitudinal positions of the cardboard web 3 together with the third signal 49 of the third detector 48 that corresponds to the longitudinal positions of the single-face web 4 before laminating. The control means 53 receiving both first and third signals 44 and 49 generates and sends a main regulation signal 54 to the motor 42 for this first regulation. The main regulation signal 54 corresponds to an acceleration or deceleration of the motor speed so that detected register marks on cardboard web 3 have a good matching with detected register marks on the single-face web 4. This first regulation corresponds to a pre-positioning of the cardboard web 3 onto the single-face web 4.

A second and fine regulation is added by using the second signal 47 of the second detector 46 that corresponds to the longitudinal positions of the laminated cardboard web 3 together with the fourth signal 52 of the fourth detector 51 that corresponds to the longitudinal positions of the laminated single-face web 4 forming part of the composite 2. The control means 53 receiving both second and fourth signals 47 and 52 generates a secondary regulation signal to the motor 42 for this second regulation.

This secondary regulation signal is added to the main regulation signal 54. Owing to the positions of both second and fourth detectors 46 and 51 downstream from the laminating roll 16, the second regulation maintains the synchronisation obtained with the first regulation. The other aim of the second regulation is to check the registering quality of the obtained composite 2 after the lamination. The secondary regulation signal provides a slight adjustment to the main regulation, leading to slight speed corrections and slight angular adjustments of the laminating roll 16.

The cutting device in the cutting unit 19 is also controlled by the laminating unit 14 to cut the composite 2 into sheets 21 with a high accuracy. The signals emitted by the first detection means, i.e. one or both of the first and second signals 44 and 47 emitted by only one or both of the first and second detectors 43 and 46 respectively, and/or by the second detection means, i.e. one or both of the third and fourth signals 49 and 52 emitted by only one or both of the third and fourth detectors 48 and 51 respectively are used to give the rate to the cutting unit 19. This operation is also known as being a "cut to mark".

A laminating method for manufacturing the multi-layer composite 2 is performed by the laminating machine 1 and comprises several steps. In a first step, the cardboard web 3 is conveyed C in a longitudinal direction. In a second step, the single-face web 4 is conveyed F in the longitudinal direction.

In a third step, the longitudinal positions of the cardboard web 3 are detected. In a fourth step, the longitudinal positions of the single-face web 4 are detected. In a fifth step, the positions of the cardboard web 3 are corrected longitudinally on the basis of the detected positions during the third step and of the detected positions during the fourth step. The correction is done by calculation. In a sixth and final step, the cardboard web 3 is bonded by being glued onto the single-face web 4 in the registered position.

The third step is divided in two sub steps. In a first sub step of the third step, longitudinal positions of the first web 3 are detected before the sixth step of bonding the first web 3 onto the second web 4. In a second sub step of the third step, longitudinal positions of the first web 3 are detected after the sixth step of bonding the first web 3 onto the second web 4.

The fourth step is divided in at least one of two sub steps. In a first sub step of the fourth step, longitudinal positions of the second web 4 are detected before the sixth step of bonding the first web 3 onto the second web 4. In a second sub step of the fourth step, longitudinal positions of the second web 4 are detected after the sixth step of bonding the first web 3 onto the second web 4.

All the detection steps consist in reading one or more modifications, i.e. printed matter or printed marks in the longitudinal direction.

The present invention is not restricted to the embodiments described and illustrated. Numerous modifications may be made without thereby departing from the context defined by the scope of the set of claims. The laminating unit 14 can make use of only one detector chosen from the third and fourth detectors 48 and 51.

What is claimed is:

1. A laminating unit to manufacture a multi-layer composite, including a first web and a second web, in a laminating machine, comprising:
    a laminating rotating roll, conveying the first web and laminating the first web onto the second web;
    driving means, rotating the laminating rotating roll;
    gripping means, maintaining the first web in contact with the laminating rotating roll;
    first detection means emitting first detection signals in accordance with detected longitudinal positions of the first web;
    second detection means emitting second detection signals in accordance with detected longitudinal positions of the second web; and
    control means, configured to increase or decrease a rotational speed of the driving means and of the laminating rotating roll as a function of the first and second detection signals, as required to correct a longitudinal position of the first web relative to the second web, and to cause the laminating rotating roll to laminate the first web onto the second web, such that the first web is laminated onto the second web in register with the second web, the laminating rotating roll being configured to remain in a position such that the first web is in contact with the second web, while registration of the first web with the second web occurs.

2. The laminating unit according to claim 1, wherein the first detection means comprises:
    a first detector positioned upstream from the laminating rotating roll detecting the longitudinal positions of the first web before being laminated onto the second web, and
    a second detector positioned downstream from the laminating rotating roll detecting the longitudinal positions of the first web after being laminated onto the second web.

3. The laminating unit according to claim 2, wherein the second detection means comprises at least one of the two following detectors:
    a third detector positioned upstream from the laminating rotating roll detecting the longitudinal positions of the second web before being laminated with the first web; and
    a fourth detector positioned downstream from the laminating rotating roll detecting the longitudinal positions of the second web after being laminated with the first web.

4. A laminating unit to manufacture a multi-layer composite, including a first web and a second web, in a laminating machine, comprising:
    a laminating rotating roll, conveying the first web and laminating the first web onto the second web;
    driving means, rotating the laminating rotating roll;
    gripping means, maintaining the first web in contact with the laminating rotating roll;
    first detection means emitting first detection signals in accordance with detected longitudinal positions of the first web;
    second detection means emitting second detection signals in accordance with detected longitudinal positions of the second web; and
    control means, varying a rotational speed of the driving means and of the laminating rotating roll as a function of the first and second detection signals, to convey the first web, to correct longitudinal positions of the first web, and to cause the laminating rotating roll to laminate the first web onto the second web, such that the first web is laminated onto the second web in register with the second web, the laminating rotating roll being configured to remain in a position such that the first web is in contact with the second web, while registration of the first web with the second web occurs,
    wherein the gripping means are in the form of at least one suction opening, drilled through an outer wall of the laminating rotating roll and being in connection with a vacuum source.

5. The laminating unit according to claim 1, wherein the gripping means are in the form of a coating made of a grip material, covering an external surface of the laminating rotating roll.

6. The laminating unit according to claim 1, wherein a cutting device in a cutting unit is controlled to cut the multi-layer composite into plate elements as a function of one or more of the first and second detection signals emitted by the first and second detection means.

7. The laminating unit according to claim 3, wherein the first, second, third, and fourth detectors are detectors capable of reading modifications on the first and second webs.

8. The laminating unit according to claim 1, wherein the laminating unit further comprises moving means for lifting and lowering the laminating rotating roll, on the basis of the thickness of the multi-layer composite.

9. The laminating unit according to claim 1, wherein the laminating unit comprises a second rotating roll for squeezing the first web against the laminating rotating roll.

10. The laminating unit according to claim 9, further comprising adjusting means for moving the second roll away from and closer to the laminating rotating roll, on the basis of the thickness of the first web.

11. A laminating machine comprising first and second feeding units and the laminating unit according to claim 1, the laminating unit being positioned downstream from the first and second feeding units, the first and second feeding units feeding the first and second webs, respectively.

12. The laminating machine according to claim 11, further comprising a unit for coating glue on a surface of the second web, positioned between the second feeding unit and the laminating unit.

13. A method for manufacturing a multi-layer composite by laminating a first web onto a second web in a laminating machine, comprising the steps of:

conveying the first web in a longitudinal direction;
conveying the second web in the longitudinal direction;
laminating the first web onto the second web, such that the first web is laminated onto the second web in register with the second web by increasing or decreasing a rotational speed of a laminating rotating roll, which laminates the first web onto the second web, as required to cause the laminating rotating roll to laminate the first web onto the second web, such that the first web is laminated onto the second web in register with the second web;
detecting longitudinal positions of the first web;
detecting longitudinal positions of the second web; and
correcting a longitudinal position of the first web relative to the second web, in accordance with the detected longitudinal positions of the first and second webs.

14. The method according to claim 13, wherein the step of detecting longitudinal positions of the first web comprises:

a first sub step of detecting longitudinal positions of the first web before the step of bonding the first web onto the second web; and a second sub step of detecting longitudinal positions of the first web after the step of bonding the first web onto the second web.

15. The method according to claim 13, wherein the step of detecting longitudinal positions of the second web comprises at least one of the two following sub steps:

a first sub step of detecting longitudinal positions of the second web before the step of bonding the first web onto the second web; and a second sub step of detecting longitudinal positions of the second web after the step of bonding the first web onto the second web.

* * * * *